Jan. 12, 1926.  1,568,996
F. H. BEST
ELECTRICAL MEASURING APPARATUS
Filed Jan. 3, 1924    2 Sheets-Sheet 1

INVENTOR
F. H. Best
BY
ATTORNEY

Jan. 12, 1926.                                              1,568,996
F. H. BEST
ELECTRICAL MEASURING APPARATUS
Filed Jan. 3, 1924          2 Sheets-Sheet 2

INVENTOR
F. H. Best
BY
ATTORNEY

Patented Jan. 12, 1926.

1,568,996

UNITED STATES PATENT OFFICE.

FRED H. BEST, OF WESTFIELD, NEW JERSEY, ASSIGNOR TO AMERICAN TELEPHONE AND TELEGRAPH COMPANY, A CORPORATION OF NEW YORK.

ELECTRICAL MEASURING APPARATUS.

Application filed January 3, 1924. Serial No. 684,247.

*To all whom it may concern:*

Be it known that I, FRED H. BEST, residing at Westfield, in the county of Union and State of New Jersey, have invented certain Improvements in Electrical Measuring Apparatus, of which the following is a specification.

This invention relates to electrical measuring apparatus and particularly to means for measuring the effect produced by line noise upon signals transmitted over the line.

Heretofore in measuring the effect upon transmission produced by currents set up in the line by extraneous sources it has been customary to compare the noise produced by such currents in a telephone receiver with the noise produced by current from another source which could be varied until the tone produced in the receiver from both sources was substantially equal in volume. Since this method of comparing the noise produced by interfering currents with that produced by a standard current involves a comparison of the two noises by the human ear, and since it is well known that the ability to judge degrees of difference varies with different persons, this method does not adequately meet all requirements.

It is the object of the present invention to provide means for the measurement of noise introduced into a telephone circuit by using a direct reading meter as an indicator of the magnitude of such noise whereby the errors introduced by the previous method may be avoided.

Figure 1:
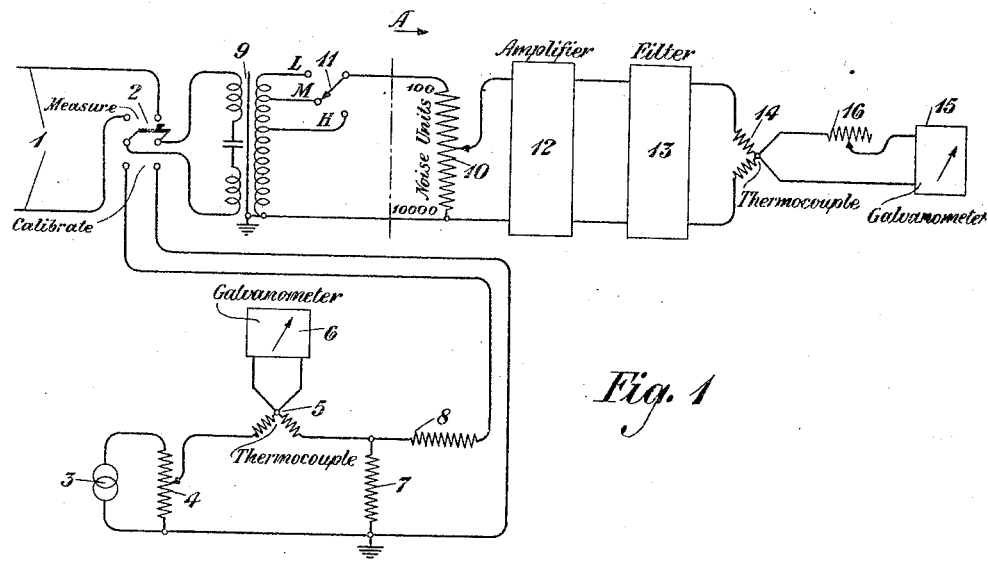
Figure 2:
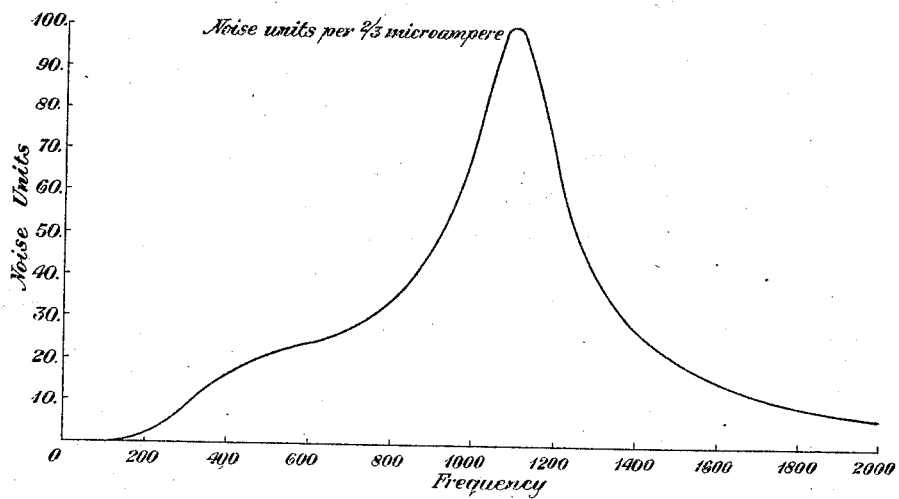
Figure 3:
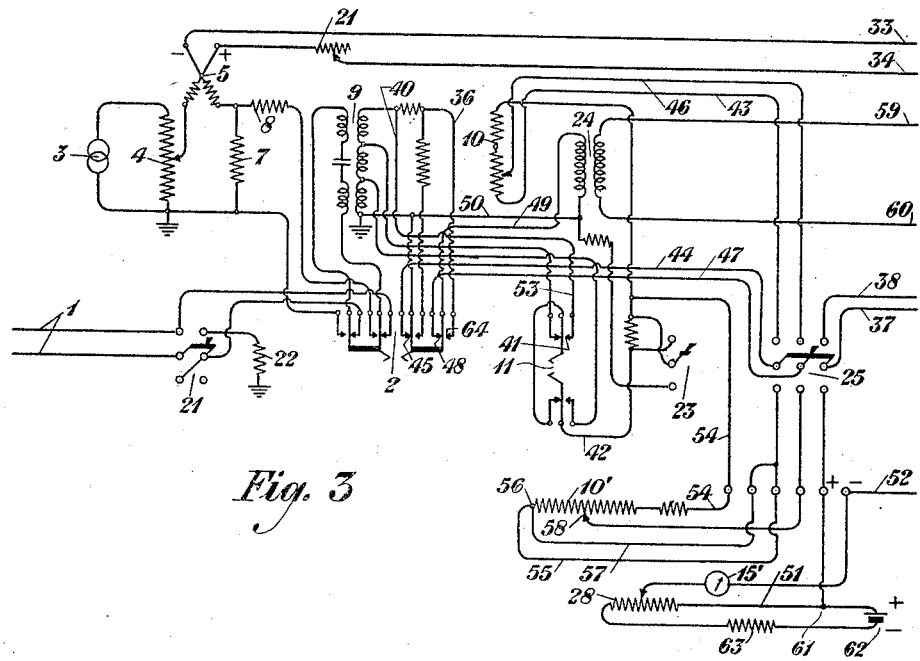

This invention will be understood from the following description when read in connection with the attached drawing, of which Figure 1 shows in schematic form an embodiment of the invention; Fig. 2 is a graph illustrating a characteristic feature of the invention and Figs. 3 and 4, when arranged so that the conductors at the left-hand side of Fig. 4 join the correspondingly numbered conductors at the right-hand side of Fig. 3, represent a form of the invention in which the operations of adjustment and recording may be performed either manually, as in Fig. 1, or automatically.

In Fig. 1, 1 represents a line exposed to a source of foreign potential so that there will be set up therein currents which will interfere with the normal signaling currents being transmitted over the said line. This line is connected with the measuring circuit through the upper contacts of the double pole double throw switch 2. The lower contacts of the switch are connected with a source of sinusoidal current of a single frequency. Since experience has shown that current of the frequency of 1100 cycles produces the most serious effect upon telephone transmission, it is preferable to operate this source at that frequency. A desirable source of current is the vacuum tube oscillator in which part of the energy of the output circuit is fed back to the input circuit. This oscillator, which is represented upon the figure by 3, is connected across the terminals of the potentiometer 4 by means of which the potential across the thermocouple 5 and the current flowing thereover, may be controlled. The object of the thermocouple 5 and the accompanying galvanometer 6 is to determine the amount of current flowing through the measuring apparatus during the process of calibration. The resistances 7 and 8 have been inserted in this circuit for the purpose of controlling the current. The movable arms of the switch 2 are connected with the terminals of the primary winding of the transformer 9, the secondary winding of which is effectively bridged across the potentiometer 10 which measures and compares the magnitudes of the interfering and the standard currents. A plurality of taps have been taken from different points of the secondary winding of transformer 9 and connected with the contact points of the switch 11 in order that the impedance of the measuring circuit itself might be properly adjusted for line circuits of various impedances. The potentiometer 10 is connected with the input side of the amplifier 12 which may be of any number of stages. This amplifier is connected with the filter 13, which in turn is connected with the thermocouple 14. The thermocouple is connected with the galvanometer 15 through a variable resistance 16. It is desired to point out that by using thermocouples the alternating currents of the various frequencies are converted into direct currents, whereby the difficulties and inaccuracies in measurement introduced by frequency are eliminated.

Before proceeding to describe the method by which the magnitude of the noise current is obtained, it is desirable to point out that in line noise measurements a certain arbitrary relation between the unit of noise and the electrical power producing the noise must be assumed. Accordingly, a power of .0006 micro-watt, of 1100 cycle current which is equivalent to a current of 1 microampere in a 600 ohm circuit, has been assumed to be equal to 150 noise units.

Since the interfering effect of extraneous line current varies with frequency, the noise measuring apparatus in order to indicate true values of line noise as they affect the understanding of the conversations, the listener must weigh the currents of different frequencies present in proportion to their relative interfering effects. With telephone apparatus in use at the present time, the relative interfering effect of the different frequencies as determined by measurements made with a number of observers is approximately as shown by the curve in Fig. 2. In the noise measuring apparatus described herein, the weighing of the frequencies in proportion to their interfering effect for equal magnitude, as indicated by this curve, is done in the circuit of Fig. 1 by means of the amplifier 12 and the filter 13, the constants of which are so chosen that the alternating current frequencies present in the input circuit are passed through the amplifier and filter in proportion to the ordinates of the curve.

The method of measuring the magnitude of the noise produced by the interfering current in the line circuit is as follows:

When the switch 2 is thrown downward in the position marked "Calibrate", a definite voltage of 1100 cycles is impressed across the primary winding of the transformer 9 and a definite voltage is thereby impressed across the potentiometer 10. To calibrate the measuring apparatus, the current in the heater of the thermocouple 5 is adjusted so that a current of two-thirds of 1 microampere flows through the primary winding of transformer 9. The magnitude of the current is indicated by the galvanometer 6, and the adjustment of the circuit to produce this flow of current is effected by means of the potentiometer 4. As stated heretofore, a current of 1 microampere at 1100 cycles per second through a circuit of predetermined resistance is equivalent to 150 noise units. Therefore the current of two-thirds of 1 microampere is equal to 100 noise units. Accordingly, in calibrating, the contact of the potentiometer 10 is always set at a fixed point marked 100 on the scale of this apparatus. This current amplified by the amplifier 12 will flow through the filter 13, and will cause a difference of potential in the thermocouple 14. The resulting current will accordingly flow through the galvanometer 15. By proper adjustment of the variable resistance 16, the needle of the galvanometer 15 may be set at any convenient point on the scale, as, for example, the point of midscale deflection thereon.

With the measuring apparatus thus calibrated, the switch 2 is now thrown to its upper position marked "Measure", and the determination of the magnitude of the line noise may be made. Current resulting from interfering potentials in the line, which may be of a single frequency or of a plurality of frequencies, will flow from the line through the switch 2 and the primary winding of the transformer 9. The current induced in the secondary winding will flow through the potentiometer 10. The voltage across the portion of the potentiometer in use will be amplified by the amplifier 12 and will cause a deflection of the galvanometer 15. As pointed out heretofore, the filter 13 and the amplifier 12 are designed to transmit therethrough the frequencies present in the interfering current in the ratio shown by the curve in Fig. 2. That is to say, that part of the current of 1100 cycles would be transmitted to the thermocouple with no attenuation, but current of 1000 cycles would be attenuated to approximately 60% of its value before being impressed on the thermocouple. By varying the position of the contact point of the potentiometer 10, the needle of the galvanometer may be again brought to its midpoint. The magnitude of the line noise is represented by the setting of the contact point of the potentiometer 10, which, as stated, has been calibrated to read directly in terms of noise units.

Figure 4:
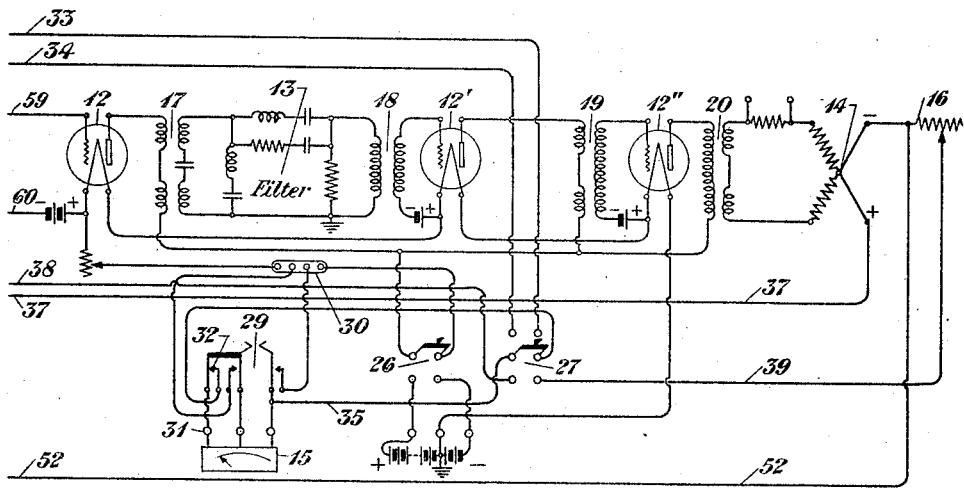

Figs. 3 and 4, when combined so that Fig. 4 is to the right of Fig. 3 and the similarly numbered conductors are joined, represent a practical embodiment of the invention. In the method described in connection with Fig. 1, the adjustment of the potentiometer 10 is made by hand and a notation is made of the reading of the potentiometer when the meter 15 is at its midscale position. The arrangement shown in Figs. 3 and 4 is intended for either manual or automatic operation. By automatic operation is meant that the balanced adjustment of the potentiometer 10 is effected either by mechanical or electrical means and that a record of the settings of this rheostat is also made in like manner.

The same numerals have been used in Figs. 3 and 4 as in Fig. 1 to represent similar parts. The line 1 is connected with a switch 21, which when thrown upwards, connects the two sides of the line in parallel to ground so that the noise meter will indicate or record the current from the line wires to ground through a finite resistance 22. When the switch is thrown downwards the noise meter indicates the noise caused by the potential across the two wires of line 1. The switch 2 connects the noise measuring apparatus either with the source of calibrating current or with the line. When the switch is in the calibrating position, that is, when it is operated, the impedance ratio of the input transformer 9 is automatically made 1 to 1 and the pointer on the dial of the potentiometer 10 is automatically set at the position representing 100 noise units. The switch 11 is used for varying the impedance ratio of the transformer 9. When the switch is thrown upward the ratio is 1 to 1, with the switch unoperated the ratio is 2 to 1 and with the switch thrown downward the ratio is 3 to 1. The switch 23 when thrown down multiplies the readings given by the potentiometer 10 by a definite amount. The switch 25, when thrown upward, establishes connections for the manual operation of the set and when thrown downward connects the noise meter with a device for automatically adjusting the potentiometer which indicates the number of noise units and also automatically records the settings thereof. The indicating and recording device, by means of which an automatic record of the line noises is obtained, is that shown in the patent to Leeds, 1,125,699, which issued on January 19, 1915, with certain modifications which will be described in full hereinafter. The galvanometer 15' is that which forms a part of the Leeds recorder. This galvanometer is connected not only with the thermocouple 14 shown on Fig. 4, but is also connected with the slide wire resistance 28, having a source of potential of approximately 1.5 volts connected therewith. As will be seen hereinafter the potentiometer 10' takes the place of the corresponding potentiometer 10 when the recording apparatus is being used. This potentiometer is connected with the shaft 31 of the apparatus disclosed in the Leeds patent and is controlled thereby in a manner which will be made clear hereinafter.

The secondary winding of transformer 24 is connected by conductors 59 and 60 with the first tube of a three-stage amplifier comprising the tubes 12, 12' and 12'', which are connected by means of the transformers 17, 18 and 19. Interposed between transformers 17 and 18 is a filter 13 which is so designed that when combined with the amplifier will transmit the various frequencies impressed thereon in accordance with the curve shown in Fig 2. The output side of tube 12'' is connected with the transformer 20, the secondary winding of which is connected with the thermocouple 14. The positive side of the thermocouple is connected with switch 25; the negative side of the couple is either connected with the galvanometer 15' of the recording device or is connected through the rheostat 16 with the switch 27. This switch, when thrown upwards, connects the thermocouple 5 with the meter 15, whereby the oscillator output may be adjusted to the proper value. When the switch 27 is operated downward the thermocouple 14 is connected with the said meter. The switch 26 is intended to connect the proper potentials to the vacuum tubes of the amplifier and the switch 29 is intended to connect the meter either with the thermocouples or with the shunt 30, the latter connection serving to measure the filament current of the vacuum tubes.

The method of operating this set when it is intended to make the adjustments and the records manually is as follows: The switch 2 is operated so as to bring the movable arms into contact with the outer contacts thereof. Switches 23, 25 and 27 are thrown upwards and switch 29 is left unoperated. The source of calibrating current 3 will cause current to flow through the potentiometer 4 which may be adjusted to control the current flowing through the thermocouple 5. With the switch 2 in its calibrating position part of the current through the thermocouple 5 will also flow through the primary winding of transformer 9. The potential caused by the flow of current through this thermocouple may be measured by the meter 15, which is connected with the thermocouple by a circuit extending from the terminal 31 of the meter through contact 32 of switch 29, thence through the upper contact of switch 27 and conductor 33 to the thermocouple, thence back through a portion of rheostat 21, over conductor 34, and through switch 27 and conductor 35 to meter 15. By varying the potentiometer 4, the current through the thermocouple is made one milliampere, of which 2/3 of a microampere flows through the primary winding of transformer 9 and which, according to the definition, is equal to 100 noise units. This flow of current through the thermocouple will produce a midscale deflection of the meter 15, the resistance 21 having been previously so adjusted that 1 milliampere of current in the heater of thermocouple 5 produces a midscale deflection on meter 15. The switch 27 is now thrown downward so that the thermocouple 14 will be connected with the meter 15. With the circuit so arranged the current from the oscillator 3 flowing through the primary winding of the transformer 9 will induce a potential in the secondary winding of transformer 9 which will cause current to flow through a circuit including conductor 36, contact 64, through the primary winding of transformer 24 and the secondary winding of transformer 9. The current flowing through the primary winding of transformer 24 will induce a potential in the secondary winding thereof which will be impressed upon the tube 12 of the amplifier. This will be amplified and the current, after passing through the filter 13, will again be amplified by the tubes 12' and 12" and the resultant current will be impressed by the transformer 20 upon the couple 14. The resultant direct current will flow from the positive terminal of the couple 14, over conductor 37, through the switch 25, thence over conductor 38 and through the switch 27 (which is now in its downward position), thence over conductor 35 to one side of the meter 15. The other side of the meter is connected through terminal 31 and contact 32, switch 27 and conductor 39 with the negative side of the couple 14, the said connection including the variable resistance 16. The resistance 16 is then adjusted until the needle of the meter 15 stands at its midposition.

The set is now adjusted for the measurement of the noise current set up in the line. If it is assumed that we want to measure noise currents caused by a potential difference across the conductors of the line 1, the switch 21 is thrown downward, thereby connecting the two sides of the line metallically through the switch 2 with the primary winding of transformer 9. Switch 2 would be put in its unoperated position, switch 11 would be operated upwards so that the impedance ratio of the windings of transformer 9 would be 1 to 1 (assuming the line 1 to be non-loaded), switch 23 would be left in its upward position and the other switches of the set would be allowed to remain as they were upon the completion of the calibration process. Accordingly, current from the line 1 will flow through the normal contacts of the left-hand-side of switch 2 and through the primary winding of transformer 9. A difference of potential will accordingly be established across the secondary winding of transformer 9, which will cause current to flow over conductor 40, through contact 41 of switch 11, thence over conductor 42 and through switch 23 to the upper end of the potentiometer 10, which indicates the number of noise units. A circuit would be completed from the lower end of this potentiometer over conductor 43, through switch 25, conductor 44, contact 45 to the opposite terminal of the secondary winding of transformer 9. The movable contact of the potentiometer 10 is connected by conductor 46, through switch 25, thence over a circuit including conductor 47, contact 48, conductor 49, primary winding of transformer 24, thence over conductor 50 to the opposite side of the secondary winding of transformer 9. It will accordingly be seen that the current flowing through the primary winding of transformer 24 is dependent upon the setting of the movable contact point of the potentiometer 10. This current induces a potential in the secondary winding of transformer 24, which will be amplified by the amplifier, and the various frequencies will be transmitted by the filter 13 and amplifier 12 in accordance with the magnitudes represented by the curve of Fig. 2. The resultant amplified current will flow through the primary winding of transformer 20 and the resultant potential in the secondary winding of said transformer will cause a flow of current through the thermocouple 14. The potential caused thereby will produce a direct current flow over the output circuit of the thermocouple, as previously traced, in the description of the calibrating process. The setting of the contact point of the potentiometer 10 is varied until the current through the thermocouple 14 is of such magnitude as to cause the needle of the meter 15 to stand at the midpoint of the scale. The setting of the potentiometer 10 indicates directly the magnitude of the noise that is produced by the current flowing in the line 1, since the potentiometer is designed to read directly in terms of noise units. We have assumed that the line has the same impedance as the noise measuring device and accordingly the ratio of transformation of the transformer 9 has been made 1 to 1 by means of the switch 11. If the line were of the heavy loaded type so that the impedance ratio would be approximately 3 to 1, the switch 11 would be operated in its downward position. If, furthermore, the line were of medium loaded type the switch would be left in its unoperated position, thereby producing a ratio of transformation of 2 to 1.

If it is desired to operate the noise meter automatically the process is as follows: The switch 25 is thrown downward so as to connect the automatic adjusting and recording device with the noise meter. The oscillator 3 is then started and the current therefrom will flow through the switch 2 when thrown in its calibrating position to the primary winding of the transformer 9. The current set up by the couple 5 will flow from the positive terminal thereof through the resistance 21, thence over conductor 34, through switch 27 (in its upward position), thence over conductor 35 and through the meter 15, thence through contacts 31 and 32 and through switch 27 and over conductor 33 to the negative contact of the couple. As in the manual system of operation the potentiometer 4 is adjusted to transmit a predetermined current through the couple and resistance 21 is adjusted so that when this current flows the needle of meter 15 will stand at the midpoint of the scale. The switch 27 is then thrown downwards. A circuit is then established from the positive terminal of the couple 14, over conductor 37, through switch 25 (which is in its downward position), thence over conductor 51 and through part of the resistance 28, thence through the galvanometer 15′, which is located in the Leeds recording device, thence over conductor 52 to the negative pole of the couple. The portion of this circuit between the junction 61 and the contact of the variable resistance 28 is in common with the circuit from the positive terminal of the battery 62 over conductor 51, through resistances 28 and 63, and back to the negative terminal of the battery 62. When the contact of potentiometer 28 is adjusted to a point such that the voltage between the point 61 and the contact is exactly equal and opposite to the voltage set up in the thermocouple 14 no current flows through the galvanometer 15; hence the galvanometer is in a state of balance. The variable resistance in the recording device is adjusted until the galvanometer pointer is at the point of balance, with the recording pen of the device at the extreme left-hand side of the record paper. This completes the calibrating operation and the set is now ready for noise measurements.

In order to measure, switch 2 is restored to its normal unoperated position and switch 11 is adjusted for the proper impedance ratio. Switch 21 will, for the purpose of description, be assumed to be in its downward position and switch 27 is also left in downward position. With the circuit thus arranged current resulting from a disturbing potential set up between the wires of line 1 will flow through the contacts of switch 2 and through the primary winding of transformer 9. The potential induced in the secondary winding thereof will cause a flow of current through a circuit extending from the upper terminal of the secondary winding, over conductor 53, through contact 41 of switch 11 (assuming that the line 1 is lightly loaded and that the switch has accordingly been operated in its upward position), thence through the switch 23 (which is in upward position), thence over conductor 54 and through the potentiometer 10′, which is associated with the recorder, thence through conductor 55, switch 25, conductor 44, contact 45 to the other terminal of the secondary of transformer 9. Another circuit will be established from the terminal 56 of the potentiometer 10′, over conductor 57, through switch 25, thence over conductor 44, contact 45, through the primary winding of transformer 24, thence over conductor 49 through contact 48, over conductor 47 through switch 25 to contact 58 of the potentiometer 10′. The current flowing through the primary winding of transformer 24 will, therefore, be proportional to the potential between the point 56 and the position of the potentiometer contact 58. The potential induced in the secondary winding of the transformer 24 will be amplified by the amplifier comprising tubes 12, 12′, and 12″ and the weight which the various frequencies will have, will be determined by the amplifier 12 and the filter 13 in accordance with the curve of Fig. 2. The resultant amplified current will flow through the couple 14 and the potential set up across the couple will cause direct current to flow from the positive side of the couple, over conductor 37, switch 25, conductor 51, part of the resistance 28, galvanometer 15′ of the recording device, thence over conductor 52 to the negative terminal of the couple. If this current is different from that which is produced by the 1.5 volt source of current flowing through the resistance 28 so as to upset the balance of the galvanometer the adjusting mechanism of the Leeds recorder will begin to operate and will continue to do so until a state of balance is effected. It will be remembered that the potentiometer 10′ is connected with the shaft of the recording device to which is attached the disc or wheel 30 as shown in the Leeds patent. When the potentiometer has moved to the position where the current transmitted through the amplifier to the couple 14 is the same as that produced by the calibrating source, a condition of balance is established and the galvanometer rests on its midpoint. The recording device also makes a record of the current that is received from the line, which is noted in terms of noise units.

From the foregoing description it will be seen that not only does this mechanism record automatically the instantaneous values of the noise currents in the line but also automatically controls the setting of the potentiometer by means of which the noise magnitudes are determined.

It will, of course, be understood that the invention is not limited to an amplifier having the number of stages shown in the drawing; nor is it limited to the combination of an amplifier and filter whose combined characteristic is such as to attenuate the frequencies in accordance with the curve of Fig. 2. Furthermore, the various values stated hereinbefore do not limit the invention, but are merely illustrative.

Although this invention has been disclosed as embodied in a particular form it is to be understood that it is capable of embodiment in other forms without departing from the spirit and scope of the appended claims.

What is claimed is:

1. In an electrical interference measuring system, the combination with a source of calibrating current of a fixed frequency, of a source of interfering current of a single frequency or a plurality of frequencies, and a measuring circuit adapted to be connected with either of said sources having a direct current indicating device, means to convert the alternating currents from said sources to direct currents, means to transmit the alternating currents of different frequencies in different proportions depending upon the effect of each frequency upon signal transmission, and a potentiometer to measure the magnitude of the interfering current.

2. In an electrical interference measuring system, the combination with a source of calibrating current of a fixed frequency, of a source of interfering current of a single frequency or a plurality of frequencies, and a measuring circuit adapted to be connected with either of said sources having a direct current indicating device, means to convert the alternating currents from said sources to direct currents, an amplifier and a filter having a combined transmission characteristic of predetermined form to transmit currents of different frequencies in different proportions depending upon the effect of the several frequencies upon signal transmission, and a potentiometer to measure the magnitude of the interfering current.

3. In an electrical interference measuring system, the combination with a calibrating source of alternating current of fixed frequency having means for measuring the current output thereof, of an interfering source of alternating current of a single frequency or a plurality of frequencies, a galvanometer, a thermocouple, means for adjusting the flow of direct current from said couple to said galvanometer, an amplifier and a filter whose combined transmission characteristic is such as to transmit currents of different frequencies therethrough in definite, predetermined proportions depending upon the relative effect of the several frequencies upon signal transmission, a potentiometer to control the potential applied to said amplifier, and switching means to connect either of said sources across said potentiometer.

4. The method of measuring the effect upon signal transmission of interfering current of a single frequency or a plurality of frequencies which consists in measuring the effect produced by a standard current of definite magnitude and of a single frequency, weighing the frequencies present in the interfering current in a predetermined manner depending upon the relative effect of different frequencies upon the transmitted signals, and comparing the interfering current as thus weighed with a standard current.

5. The method of measuring the effect upon telephone transmission of interfering current of a single frequency or of a plurality of frequencies which consists in measuring a standard current of definite magnitude and of a single frequency, the measurement being in units representing the detrimental effect upon transmission, then weighing the frequencies present in an interfering current, and measuring this current by the same units.

6. The method of measuring the effect upon telephone transmission of interfering current of a single frequency or of a plurality of frequencies which consists in calibrating a measuring system by current of a known frequency and magnitude, then applying to the measuring system current of unknown frequency or frequencies and of unknown magnitudes, attenuating by filtering the applied frequencies so that they will be transmitted through the system in predetermined proportions depending upon the relative effects of the several frequencies upon telephone transmission, and measuring the currents as thus attenuated.

7. The method of measuring the effect upon telephone transmission of interfering current of a single frequency or of a plurality of frequencies which consists in calibrating a measuring system by current of a known frequency and magnitude from a controllable source, then applying to the measuring system interference currents of unknown frequency or frequencies and of unknown magnitudes, amplifying and attenuating by filtering the said currents of unknown frequencies and magnitudes so that the said currents will be transmitted through the system in definite proportions depending upon the interference effect of each frequency upon the transmission of signals, and determining the magnitude of the interference currents as thus attenuated.

8. The method of measuring the effect upon telephone transmission of interfering current of a single frequency or of a plurality of frequencies which consists in calibrating a measuring system by current of a known frequency and magnitude, then applying to the measuring system current of unknown frequency or frequencies and of unknown magnitudes, attenuating by filtering the applied frequencies so that they will be transmitted through the system in predetermined proportions depending upon the interference effect of each frequency upon the transmission of signals, converting the applied alternating currents to equivalent direct currents, and measuring the currents as thus converted.

In testimony whereof, I have signed my name to this specification this 26th day of December, 1923.

FRED H. BEST.